United States Patent [19]

Ackley

[11] Patent Number: 4,632,028
[45] Date of Patent: Dec. 30, 1986

[54] APPARATUS FOR ORIENTING AND PRINTING CAPSULES

[76] Inventor: E. Michael Ackley, 1273 N. Church St., Moorestown, N.J. 08057

[21] Appl. No.: 673,482

[22] Filed: Nov. 20, 1984

[51] Int. Cl.$^4$ .................. B65G 47/24; B41F 17/36
[52] U.S. Cl. ..................... 101/40; 198/384; 198/393; 198/397
[58] Field of Search .............. 198/383, 384, 389, 390, 198/391, 393, 396, 397; 101/35, 36, 37, 40

[56] References Cited

U.S. PATENT DOCUMENTS

| | | | |
|---|---|---|---|
| 2,186,652 | 1/1940 | Orth et al. ..................... | 198/396 X |
| 2,389,287 | 11/1945 | Whitmore et al. .............. | 198/390 |
| 2,785,786 | 3/1957 | Bartlett ........................ | 101/35 X |
| 2,859,689 | 11/1958 | Ackley ......................... | 101/35 |
| 3,365,047 | 1/1968 | Schmitz ........................ | 198/396 X |
| 3,889,591 | 6/1975 | Noguchi ........................ | 101/37 |
| 4,104,966 | 8/1978 | Ackley, Jr. et al. ............. | 101/40 |
| 4,167,226 | 9/1979 | Ackley ......................... | 101/40 X |
| 4,266,478 | 5/1981 | Ackley ......................... | 101/40 |
| 4,353,456 | 10/1982 | Yamamoto ....................... | 198/384 X |
| 4,393,973 | 7/1983 | Ackley, Sr. et al. ............. | 198/384 |
| 4,394,933 | 7/1983 | Ackley ......................... | 198/397 X |

FOREIGN PATENT DOCUMENTS 2414729  10/1975  Fed. Rep. of Germany ...... 198/389

Primary Examiner—Clifford D. Crowder
Attorney, Agent, or Firm—Weiser & Stapler

[57] ABSTRACT

A carrier for aligning a plurality of generally cylindrical articles for presentation to a printing apparatus incorporates at least one pocket having a pair of recesses formed at an angle to one another, a first of the recesses being oriented so as to receive an article from an article rectification apparatus and a second of the recesses being oriented so as to present the article to the printing apparatus, and sloping surfaces connecting the pair of recesses so that an article received in the first recess is capable of being transported along the sloping surfaces to the second recess as the carrier proceeds to the printing apparatus. An article orienting apparatus which incorporates such a carrier; an improved feed mechanism comprised of at least one finger positioned in the feed hopper so as to longitudinally reciprocate in an arcuate path along the surface of the rectifying drum; and an improved mechanism for providing a vacuum to selected portions of the various drums which comprise the article orienting apparatus.

50 Claims, 10 Drawing Figures

APPARATUS FOR ORIENTING AND PRINTING CAPSULES

BACKGROUND OF THE INVENTION

The present invention relates generally to materials handling, and in particular, to an apparatus for orienting generally cylindrical articles in specified fashion, for subsequent printing with desired indicia.

While applicable to the handling of a variety of different articles, the present subject matter is described with particular reference to the handling of shapes which are commonly used by the pharmaceutical industry in packaging various medicinal compounds, or by the food industry in packaging various candies and the like. In their preparation, it is the usual practice to imprint certain indicia on the surfaces of such articles, including, for example, the name of the manufacturer or a tradename identifying the article, or to provide other information which may be required by the Food and Drug Administration or by other Governmental agencies.

One technique which is often used to imprint such indicia is the spin printing technique. In such case, the preferred practice is to orient the article, prior to imprinting, so that the indicia are applied at the same desired location on each article imprinted. Thus, it is important that such articles be uniformly supplied to the spin printing device in correct orientation.

Such spin printing techniques have been found to be particularly useful in applying indicia to the telescoping two-part capsules which are commonly used by the pharmaceutical industry to package various medicinal compounds. To this end, a variety of methods and devices have been suggested in the past for orienting such capsules so as to promote a spin printing operation, several of which have been adopted for use by the pharmaceutical industry. Examples of a general class of apparatus which has found broad acceptance in the pharmaceutical industry may be had with reference to U.S. Pat. Nos. 4,394,933; 4,369,702; and 4,266,478. Reference is also made to the subject matter of International Publications No. WO 82/03843 and No. WO 82/03842 and the devices which they describe. In each case, there is generally described a capsule orienting apparatus wherein capsules generally comprising a cap portion overfitting a body portion are placed within a feed hopper in random orientation for sequential delivery to a first, rectifying drum followed by a second, transfer drum, which combine to place (rectify) the capsules in a desired orientation for eventual transfer to a conveying mechanism which is capable of drawing the oriented capsules past a spin printing device.

In connection with those patents listed above, spin printing of the oriented capsules is accomplished by delivering the oriented capsules from the transfer drum to a third rotating drum which is provided with a series of carriers disposed in its periphery so as to enable each carrier to rotate about its axis as the drum rotates about its access. A cam and follower arrangement is then used to rotate each carrier from a first position in which each carrier is aligned so as to receive an oriented capsule from the transfer drum (a longitudinal position) to a second position which is more appropriate for spin printing (a transverse position). Thus, the printing operation becomes dependent upon movable carriers which are subject to wear, particularly at the cam and follower interface. It was therefore deemed desirable to eliminate this potential for wear in order to reduce servicing intervals for the apparatus.

One such attempt in eliminating the need for rotating carrier elements may be had with reference to U.S. Pat. Nos. 4,413,566 and 4,266,477. As previously, the apparatus disclosed incorporates a pair of drums which are useful in placing a quantity of capsules in a specified orientation, in this case such that the body portion of the capsule precedes the cap portion upon its discharge from the transfer drum. The oriented capsules are then transferred to a conveyor comprised of a series of carriers having sloped surface portions which are useful in directing the capsules toward capsule receiving pockets which are properly oriented for subsequent spin printing operations to take place. To assist in this process, this turning of capsules is initiated by a configured shoe associated with the back guide which cooperates with the transfer drum to deliver the capsules to the conveyor. While such structure has served to rotate received capsules through an appropriate angle without necessitating the use of a rotating carrier construction, this technique has not proven to provide the degree of reliability which is desired in connection with the handling of such articles on a mass production basis. Thus, the need remained to develop a reliable means for rotating capsules as previously described without necessitating the use of a rotating carrier construction.

SUMMARY OF THE INVENTION

It is therefore an object of the present invention to provide an improved article orienting apparatus.

It is also an object of the present invention to provide an improved article orienting apparatus which is particularly well suited to the handling of generally cylindrical articles such as are commonly used in the pharmaceutical and food industries.

It is also an object of the present invention to provide an improved article orienting apparatus which is capable of realigning articles received from an article rectifying device, so as to promote a subsequent printing operation, without moving parts.

It is also an object of the present invention to provide an improved article orienting apparatus which is capable of realigning articles received from an article rectifying device, for subsequent delivery to a printing apparatus, without moving parts, yet with improved reliability.

These and other objects which will become apparent are achieved in accordance with the present invention by providing an article orienting apparatus which generally makes use of a pair of cooperating drums to first rectify a series of articles so that such articles are discharged from the second of the cooperating drums in a generally longitudinal orientation, and a series of configured pockets for receiving the articles discharged from the orienting drums, which pockets are configured to receive each article such that the article is directed for rotation along sloped surface portions and into an article receiving recess which is appropriately oriented for subsequent printing operations. In this manner, the article is realigned from the generally longitudinal orientation in which it is received from the rectifying drums, to a generally transverse orientation which is appropriate for subsequent printing operations, without necessitating movement of the article receiving pockets provided.

To this end, an article carrier is provided which incorporates one or more configured pockets generally characterized by a pair of capsule receiving recesses which are substantially perpendicular to one another and which communicate with one another by means of configured, sloped portions which combine to develop a "butterfly" pattern. A first recess is adapted to receive articles discharged from the rectifying drums in a generally longitudinal orientation. The received article is then capable of rolling down the sloped surface portions of the pocket, to the second recess, while in the process rotating from the generally longitudinal orientation in which the article is received to a generally transverse position which is suitable for a spin printing operation. Upon reaching the bottom of the sloped portions provided, the article is then appropriately seated in the second recess for presentation to a spin printing apparatus.

The article orienting apparatus of the present invention further incorporates various other improvements over previously available devices of this type. Included is a system of reciprocating fingers which improve the reliability in feeding articles from the hopper which originally receives the articles, in random fashion, for delivery to the first of the article rectifying drums. Also included is a simplified mechanism for providing the article rectifying drums with a vacuum (or compressed air) at various phases of their operating cycle, to facilitate the rectification process.

These and other features combine to provide an article orienting apparatus which is extremely reliable, yet significantly simplified in construction in relation to previously available devices of this type. For further detail regarding a preferred embodiment article orienting apparatus produced in accordance with the present invention, reference is made to the following detailed description, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENT

Figure 1:
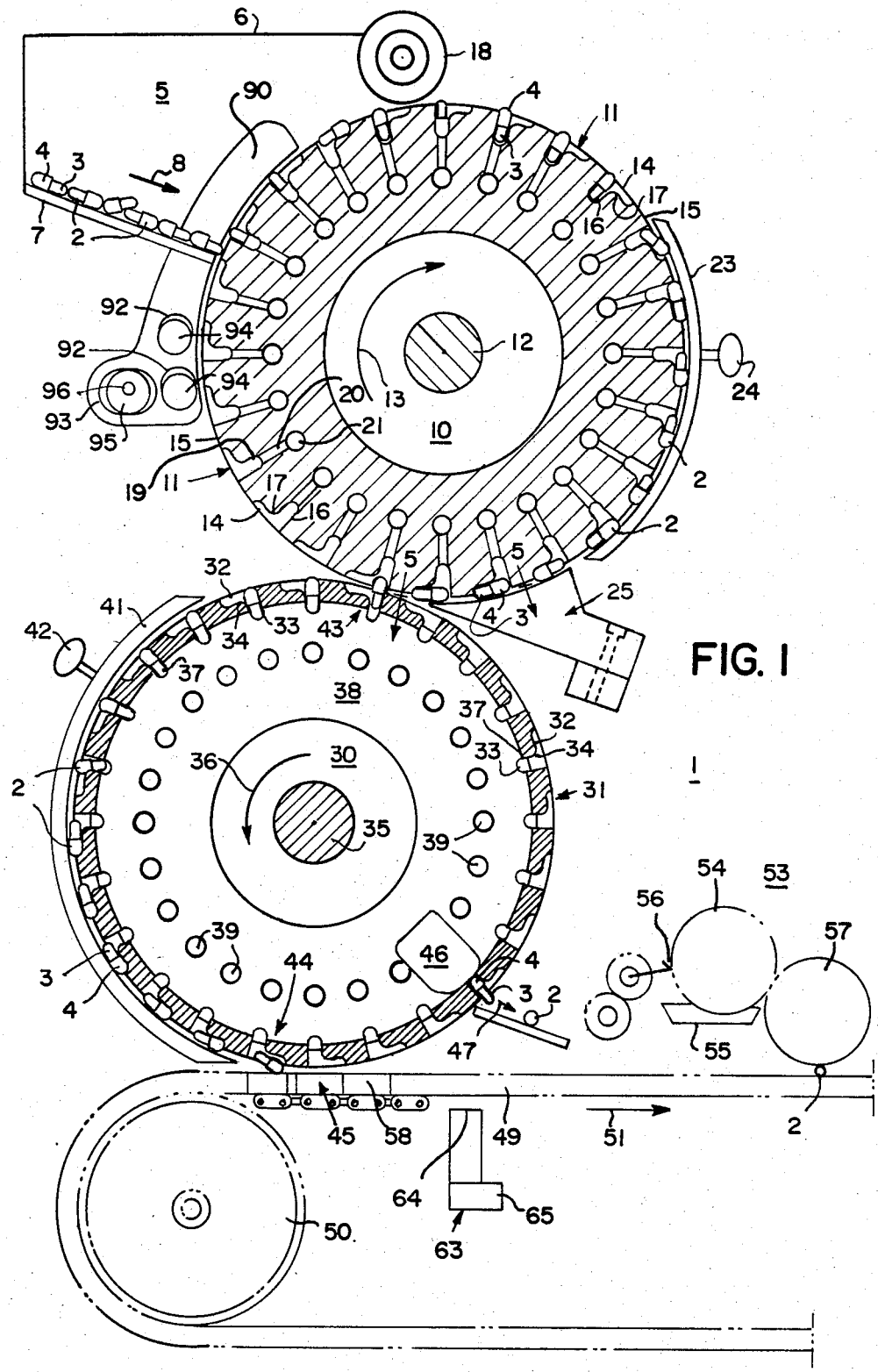
FIG. 1 is a schematic, sectional view of an article orienting apparatus in accordance with the present invention.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates an apparatus for orienting articles for subsequent processing in accordance with the present invention. The apparatus 1 illustrated in FIG. 1 is specifically configured to receive and rectify a series of capsules 2 such as are commonly used in the pharmaceutical industry, for a subsequent spin printing operation. Such capsules 2 generally comprise a truncated, generally cylindrical body portion 3 and a correspondingly shaped cap portion 4 which is sized to telescopically overfit and frictionally engage the body portion 3 to develop an enclosure for containing a desired medication. For the purposes of discussion, the following description will address the present invention in terms of the rectification and spin printing of a series of such capsules 2. However, it is to be understood that the article orienting apparatus of the present invention will find applicability in connection with a variety of different types of articles apart from capsules, including sealed cylindrical containers, nuggets, caplets, or any pellet which is capable of receiving indicia by means of spin printing techniques.

The orienting apparatus 1 receives a quantity of capsules 2 to be processed within a hopper 5 located along the top of the apparatus 1. Hopper 5 conventionally comprises side walls 6 and a sloped bottom 7 which combine to direct capsules 2 in the direction of arrow 8 toward a first, rectifying drum 10. In this regard, it will be noted that some of the capsules will be longitudinally delivered to the rectifying drum 10 with their body portions 3 leading. Others will be longitudinally delivered to the rectifying drum 10 with their cap portions 4 leading. Still others will, at times, be delivered to the rectifying drum 10 at an angle to the axis defined by the arrow 8.

Such capsules 2 are received by the rectifying drum 10 within a series of pockets 11 disposed about the periphery of the rectifying drum 10 as the rectifying drum 10 rotates about an axis defined by shaft 12, in the direction of arrow 13.

Each pocket 11 comprises a generally peripherally disposed portion 14 formed in the outer surface 15 of the rectifying drum 10 and facing in the general direction of rotation of the rectifying drum 10, and a generally radially disposed portion 16 which communciates with the peripheral portion 14 along a sloped surface 17. Most of the capsules 2 received from the hopper 5 will be delivered to the radial portions 16 of the pockets 11 with either their body portion 3 or their cap portion 4 leading, depending upon their orientation in the hopper 5. This transfer of capsules 2 from the hopper 5 to the rectifying drum 10 is facilitated by the sloping bottom 7 of the hopper 5, which is preferably disposed at an angle which is in general alignment with the radial portions 16 of the pockets 11. At times, skewed capsules 2 will be delivered to peripheral portions 14 of the pockets 11.

For reasons which will become apparent from the following description, it is important that each of the capsules 2 ultimately seat within the radial portion 16 of a pocket 11 as the pocket 11 is conveyed from beneath the hopper 5. To assist in both the orienting and seating of capsules 2 in radial portions 16 of the pockets 11, a rotating brush 18 is preferably positioned at the apex of the hopper 5. To further assist in the seating of capsules 2 within the radial portions 16 of the pockets 11, a vacuum is advantageously applied at the base 19 of the radial portions 16 when in the vicinity of the hopper 5, to draw the capsules 2 into the radial portions 16 as they are conveyed from beneath the hopper 5.

Figure 2:
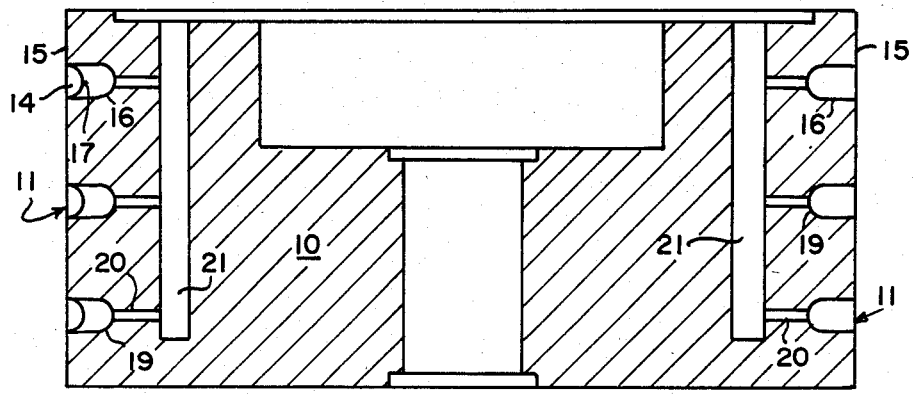
FIG. 2 is a cross-sectional view of the rectifying drum of the apparatus illustrated in FIG. 1.
Figure 4:
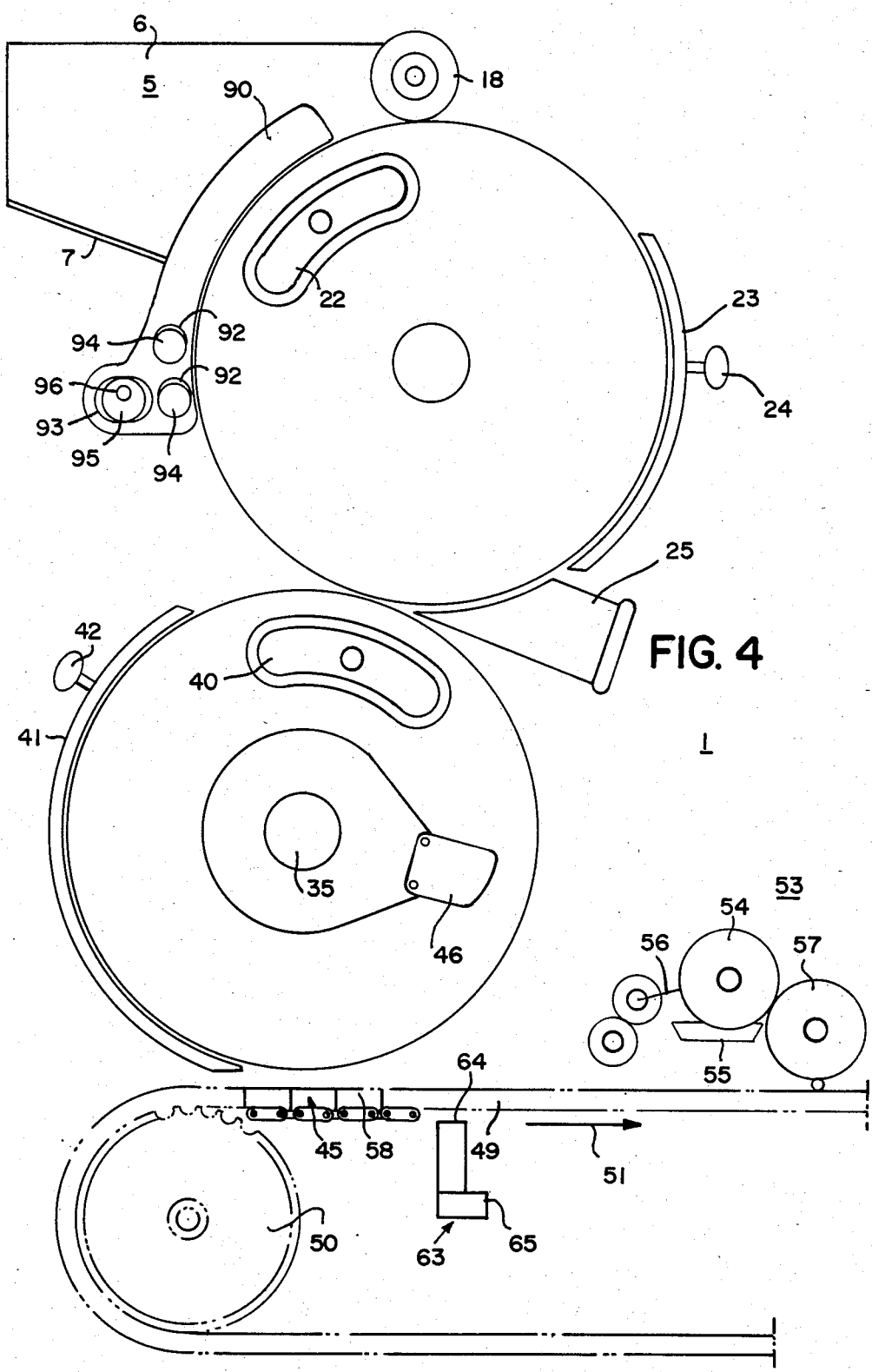
FIG. 4 is an elevational view of the structure illustrated in FIG. 1, with the rectifying and transfer drums removed to show internal construction detail.
Figure 9:
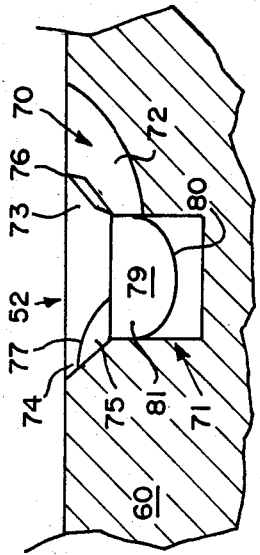
FIG. 9 is a sectional view of the pocket shown in FIG. 7, taken along line 9—9.

To this end, a series of channels 20 are provided which extend between the base 19 of each pocket 11 and a series of manifolds 21 which extend transversly through the rectifying drum 10 as is best illustrated in FIG. 2 of the drawings. Thus, the selective application of a vacuum to the manifolds 21 serves to develop a vacuum at the base 19 of selected pockets 11, as desired. With reference to FIG. 4, such a vacuum is advantageously applied to the manifolds 21 by means of a manifold 22 which is positioned adjacent to the rectifying drum 10 and in registration with selected manifolds 21. In the embodiment illustrated in the drawings, the manifold 22 extends about the rectifying drum 10, as shown, along substantially the entire length of the interface between the hopper 5 and the rectifying drum 10. Such positioning is, of course, capable of variation as needed, and is preferably capable of adjustment by rotating the manifold 22 about the axis defined by the shaft 12 of the rectifying drum 10.

To be noted is that in the schematic view of FIG. 1, a single series of pockets 11 is illustrated as extending about the periphery of the rectifying drum 10, at spaced intervals. However, it will be understood that additional series (or rows) of pockets 11 may be provided across the face of the rectifying drum 10, if desired, to provide the capability of receiving capsules 2 from the hopper 5 for parallel transfer through the apparatus 1 as will be described more fully below. Further discussion of the apparatus 1 will proceed in connection with a single row of pockets 11, for the purposes of clarity. The simultaneous processing of parallel rows of capsules would proceed similarly by providing plural structures in accordance with the following description, as is conventional in this art. However, it is to be noted that since the manifolds 21 extend transversly through the rectifying drum 10, a vacuum developed at the manifold 22 will simultaneously be applied to each of the rows of pockets 11 provided, at the desired location along the rectifying drum 10, facilitating the parallel processing of capsules 2 in accordance with the present invention. In such case, certain adjustments may be required to assure that each of the several rows of pockets 11 provided receives adequate vacuum.

As the rectifying drum 10 rotates in the direction of arrow 13, the capsules 2 will be drawn from beneath the hopper 5, seated within the radial portions 16 of the pockets 11 as previously described. Upon further rotation of the rectifying drum 10, the capsules 2 will move from the radial portions 16 of the pockets 11 to the peripheral portions 14, primarily as a result of gravity. A back guide 23 overfits the rectifying drum 10 in the vicinity of this transition to guide the capsules 2 into their desired position, and to make sure that the capsules 2 are retained within the pockets 11 as they traverse the lower portions of the rectifying drum 10. An air jet 24 is advantageously positioned so as to extend through the back guide 23 as shown to further assist in the transfer of capsules 2 from the radial portion 16 of a pocket 11 to its peripheral portion 14.

Figure 5:
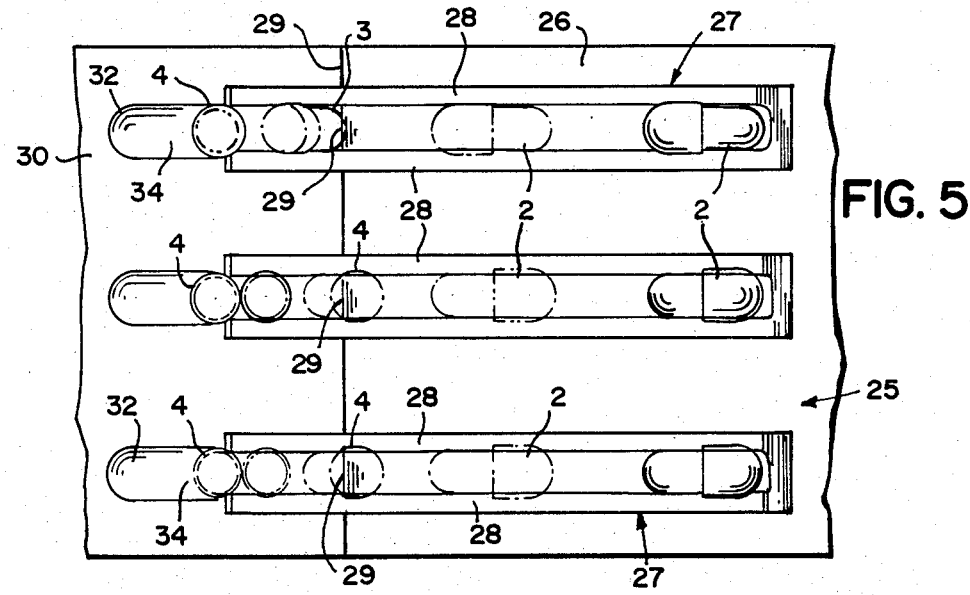
FIG. 5 is a partial, plan view of the apparatus illustrated in FIG. 1, as viewed along line 5—5, showing the article rectifying guide.

With reference to FIG. 5, the base of the rectifying drum 10 is provided with rectifying means 25 which generally comprises a guide 26 incorporating one or more channels 27. One of the channels 27 is positioned in alignment with each of the rows of pockets 11 formed in the rectifying drum 10. In the example shown, three such rows are provided. Each of the channels 27 are defined by spaced walls 28 which project from the terminating edge 29 of the guide 26 so that the end of each channel 27 is open at the bottom.

The channels 27 are of a width which is capable of receiving the body portion 3 of a capsule 2, but which prevents the entry of a cap portion 4 of a capsule 2. As a result of this construction, any capsules 2 which are contained in the peripheral portion 14 of a pocket 11 such that the body portion 3 leads the cap portion 4 will be received within the guide 26 such that the capsule 2 will rotate about a horizontal axis, within the channel 27, so that the capsule 2 is suspended between the walls 28 of the channel 27 by its cap portion 4. Capsules 2 which are contained in the peripheral portion 14 of a pocket 11 such that the cap portion 4 leads the body portion 3 will proceed along the channel 27 until the body portion 3 is drawn beyond the edge 29 of the guide 26, whereupon such capsules 2 will also rotate about a horizontal axis, within the channel 27, so that the capsule 2 is again suspended from the walls 28 of the channel 27 by its cap portion 4.

After traversing the guide 26, the capsules 2 are then delivered to a second, transfer drum 30 associated with the article orienting apparatus 1 and adapted for rotation about an axis defined by shaft 35, in the direction of arrow 36. The transfer drum 30 is again provided with pockets 31 formed in its periphery and comprised of a generally peripherally disposed portion 32 and a generally radially disposed portion 33 separated by a sloped surface 34 which facilitates the passage of capsules 2 between the radial portion 33 and the peripheral portion 32 as will be described below.

The pockets 31 of the transfer drum 30 are positioned at spaced locations along the periphery of the transfer drum 30 which generally correspond to the spacing of the pockets 11 of the rectifying drum 10. Additionally, rotation of the transfer drum 30 is synchronized to rotation of the rectifying drum 10 so that pockets 31 of the transfer drum 30 are brought into registration with pockets 11 of the rectifying drum 10 at the interface between these two structures. As a result, capsules 2 traversing the rectifying drum 10 and suspended from the guide 26 as previously described are capable of being passed to the transfer drum 30 at this interface, entering the radial portions 33 of the pockets 31. It will be noted that even capsules 2 which may have remained in the radial portion 16 of a pocket 11 of the rectifying drum 10 will be delivered to the radial portion 33 of a pocket 31 at this interface.

Figure 3:
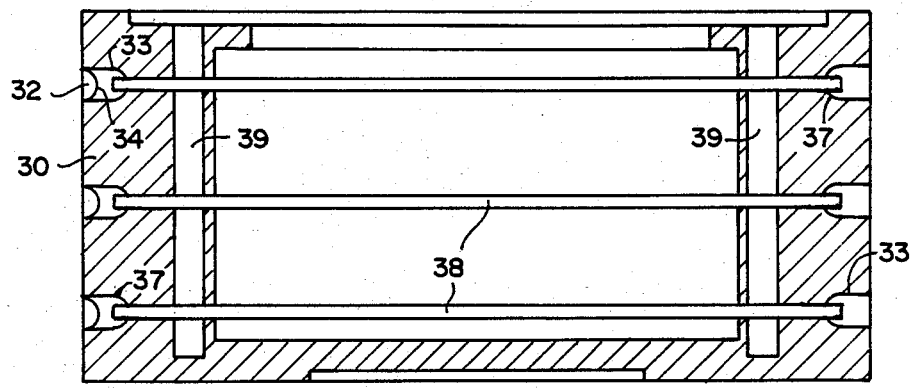
FIG. 3 is a cross-sectional view of the transfer drum of the apparatus illustrated in FIG. 1.

Such transfer is primarily accomplished by means of gravity. However, a vacuum is advantageously applied at the interface between the drums 10, 30 to facilitate such transfer, if desired. To this end, the base 37 of each pocket 31 is open to the interior of the transfer drum 30, communicating with a slotted region 38 provided in the transfer drum 30 for purposes which will be described below. As is most clearly shown in FIG. 3, a series of manifolds 39 extend transversly through the transfer drum 30, in general radial alignment with the open bases 37 of the pockets 31. A manifold 40 which is similar in construction to the manifold 22 described in connection with the rectifying drum 10, is provided to develop an appropriate vacuum along those portions of the transfer drum 30 which are to receive capsules 2 from the rectifying drum 10. The application of a vacuum to selected manifolds 39 serves to develop a vacuum at the bases 37 of corresponding pockets 31, providing assistance in the transfer of capsules 2 from the rectifying drum 10 to the transfer drum 30. Again, the above described structure would be repeated in the event that additional rows of pockets 31 are to be provided in the surface of the transfer drum 30 so as to enable the article orienting apparatus 1 to process series of capsules 2 in parallel as previously described.

By virtue of the foregoing, rectified capsules 2 will be delivered from the rectifying drum 10 to the transfer drum 30 such that the capsules 2 become seated in radial portions 33 of the pockets 31 of the transfer drum 30, with the body portions 3 of the capsules 2 generally facing radially inwardly. It will be understood that a small portion of the capsules 2 being processed will not be properly rectified as previously indicated, but rather will represent a potential misfeed. Such capsules will also be received within the radial portion 33 of a pocket 31, but in some cases with their cap portion 4 facing radially inwardly. As a means for segregating such misfed capsules from the remaining capsules which are to be processed by the apparatus 1, the base 37 of the radial portion 33 of each pocket 30 is sized to slidingly receive the body portion 3 of a capsule 2, and to frictionally engage the cap portion 4 of a capsule 2. Thus, properly fed capsules 2 will be slidingly retained within the pockets 31, while misfed capsules 2 will be frictionally retained within the pockets 31, for subsequent segregation as will be more fully described below.

Rotation of the transfer drum 30 about the shaft 35 conveys the capsules 2 contained within the pockets 31 beneath a second back guide 41, which overfits the transfer drum 30 as shown. Within the confines of the back guide 41, the majority of the capsules 2 being processed (those which are slidingly retained in the pockets 31) move from the radial portion 33 of a pocket 31 to its peripheral portion 32, with the assistance of gravity. Again, an air jet 42 extending through the back guide 41 may be used to assist in this transfer. Back guide 41 again serves the dual purpose of guiding capsules 2 into the peripheral portions 32 of the pockets 31, and retaining the capsules 2 within the peripheral portions 32 of the pockets 31 during subsequent rotation of the transfer drum 30 about its axis. Misfed capsules 2 (those with their cap portion 4 facing radially inwardly) are frictionally retained within the radial portion 33 of a pocket 31 as the transfer drum 30 traverses the back guide 41.

By virtue of this operation, capsules 2 will be retained within the pockets 31 of the transfer drum 30 in either of two orientations. Properly fed capsules 2 will be loosely retained within the peripheral portion 32 of a pocket 31, with the cap portion 4 of each capsule 2 leading its body portion 3. Misfed capsules 2 will be frictionally retained within the radial portion 33 of a pocket 31. As the pockets 31 are drawn from beneath the back guide 41, at 43, those capsules 2 which are loosely retained within the peripheral portion 32 of a pocket 31 are delivered from the transfer drum 30 to a system of carriers 45 for subsequent processing. Those capsules 2 which are frictionally retained within the radial portion 33 of a pocket 31 (a misfeed) will continue to proceed about the transfer drum 30, past the delivery point 43, to a discharge point at 44. As previously indicated, the transfer drum 30 incorporates a series of slotted regions 38 which extend to the base 37 of each of the pockets 31. A knock-out bar 46 is positioned within each of these slotted regions 38 at the discharge point 44 so as to force any capsules 2 which are frictionally retained within the radial portion 33 of a pocket 31 out of the pocket 31 in the direction of arrow 47.

Accordingly, the foregoing operations serve to uniformly and longitudinally deliver a series of capsules 2 from the transfer drum 30 to the carriers 45 with their cap portions 4 leading their body portions 3. Further detail regarding this process may be had with reference to U.S. Pat. No. 4,394,933, the subject matter of which is incorporated by reference as if fully set forth herein.

The carriers 45 form an operative portion of a conveyor system. To this end, opposite ends of the carriers 45 are supported in position by a pair of endless chains 49 conveyed by means of sprockets 50 in the direction of arrow 51. For the purposes of clarity, only a few carriers 45 have been shown in operative association with the conveyor system 48, it being understood that additional carriers 45 would ordinarily be placed about the entire length of the chains 49 so as to facilitate serial processing of the capsules 2 which are discharged from the transfer drum 30.

The carriers 45 receive the capsules 2 from the transfer drum 30 in pockets 52 which are configured in accordance with the present invention so as to convey the capsules 2 to a spin printing apparatus 53, and to operate in conjunction with the spin printing apparatus 53 to apply suitable indicia to the surface of each capsule 2, as desired. To this end, the spin printing apparatus 53 is essentially conventional, incorporating a design roll 54 which bears the indicia desired, and which is disposed within an ink well 55 so as to take up ink as the design roll proceeds through the printing process. Excess ink is wiped from the surface of the design roll 54 by means of a doctor blade 56, and the resulting pattern is thereafter transferred from the design roll 54 to a capsule 2 by means of a transfer roll 57.

In connection with the spin printing process, it will be understood that each capsule 2 must be reoriented from the longitudinal position in which it is received from the transfer drum 30 to a generally transverse position which is appropriate for passage beneath the transfer roll 57. Additionally, each capsule 2 must be secured in position so as to be capable of spinning about its longitudinal axis as it passes beneath the transfer roll 57 of the spin printing apparatus 53. To accommodate these needs, carriers 45 such as are illustrated in FIG. 6 are provided in accordance with the present invention.

Each of the carriers 45 generally comprises a support bar 58 which is capable of extending between the opposing chains 49 of the conveyor system 48, for attachment to the chains 49 by means of appropriate fasteners (not shown) extending through apertures 59 formed in opposing ends of the support bar 58. The center of the support bar 58 is depressed so as to receive an insert 60 which incorporates one or more pockets 52 along its length. In the embodiment illustrated in FIG. 6, an insert 60 having a series of three pockets 52 is shown. However, it is to be understood that the number of pockets 52 provided in a given embodiment will depend upon the number of rows of pockets 11, 31 which are used in processing capsules 2 as previously described. In its preferred embodiment, the insert 60 is formed of a plastic material, such as "Delrin" (DuPont), so as to prevent scoring or other damage to the capsules 2 as they spin within the pockets 52 by operation of the spin printing apparatus 53.

The bottom of each support bar 58 is provided with a bearing block 62 which depends from each carrier 45 as is best illustrated in FIGS. 1 and 4. The bearing block 62 is configured so as to be capable of contacting vibration means 63 associated with the conveyor system 48. Vibration means 63 generally comprises a bearing surface 64, preferably formed of a plastic such as "Nylatron" (DuPont), and a vibrator 65 for causing vibration of the bearing surface 64. In operation, the bearing block 62 is drawn across the bearing surface 64 as each carrier 45 is conveyed to the spin printing apparatus 53. The resulting vibrations have been found to be useful in assuring that the capsules 2 are properly seated within the pockets 52 of each carrier 45 for presentation to the spin printing apparatus 53.

Figure 6:
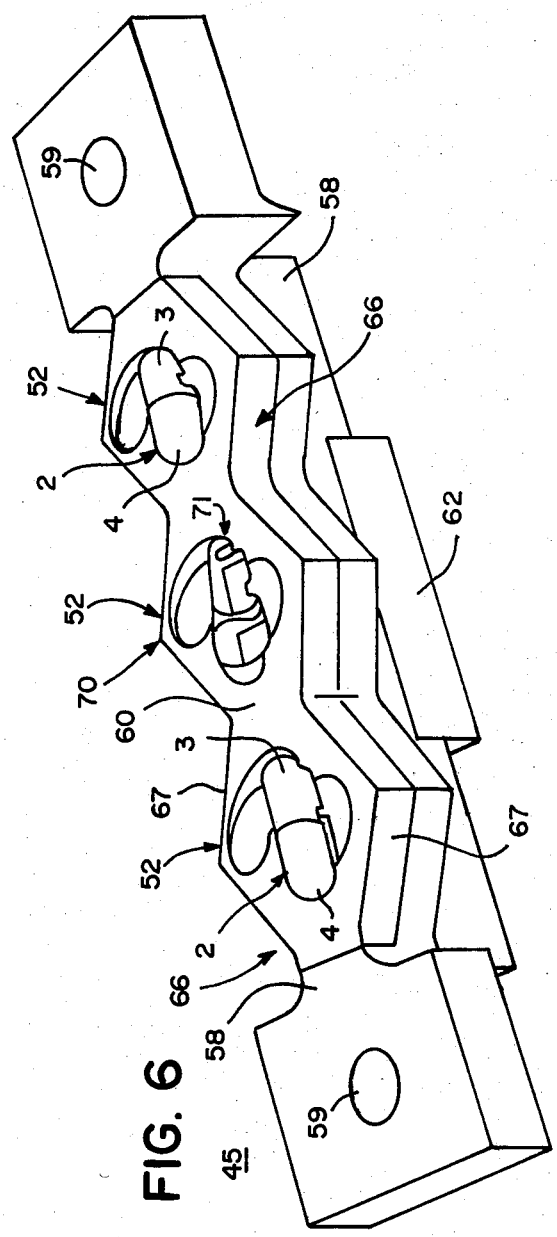
FIG. 6 is a perspective view of a carrier bar produced in accordance with the present invention.

In the embodiment illustrated in FIG. 6, the carrier 45 is configured so as to develop a series of notches 66 in its sides 67. These notches 66 are optionally provided so as to permit capsules 2 which are not effectively received within a pocket 52 to pass between adjacent carriers 45, for discharge prior to passage beneath the spin printing apparatus 53. Should it be desirable not to discharge capsules through to the conveyor system 48, it is preferred that the insert 60 be notched so that misfed capsules 2 may be received on and between adjacent support bars 58, until such time as the cradled capsule passes over the end of the conveyor system 48 and is discarded.

Each of the pockets 52 is generally comprised of a pair of essentially perpendicular recesses 70, 71. Recess 70 is a shallow recess which is oriented so as to receive a capsule 2 from the transfer drum 30 in a generally longitudinal direction with its cap portion 4 leadings its body portion 3. Recess 71 is a relatively deep cradle which is adapted to receive and appropriately seat a capsule 2 for subsequent spin printing operations. Recesses 70, 71 are separated by paired surfaces 72, 73 and 74, 75 which slope continuously and progressively downwardly from the recess 70 to the recess 71. Each of the paired sloping surfaces 72, 73 and 74, 75 are configured to permit rotation of a portion of a capsule 2 from the recess 70 to the recess 71. Since the cap portion 4 of a capsule 2 is somewhat shorter and wider than the body portion 3 of a capsule 2, the pair of sloping surfaces 72, 73 which receive the cap portion 4 will be somewhat shorter and deeper than the pair of sloping surfaces 74, 75 which receive the body portion 3 of the capsule 2.

Figure 7:
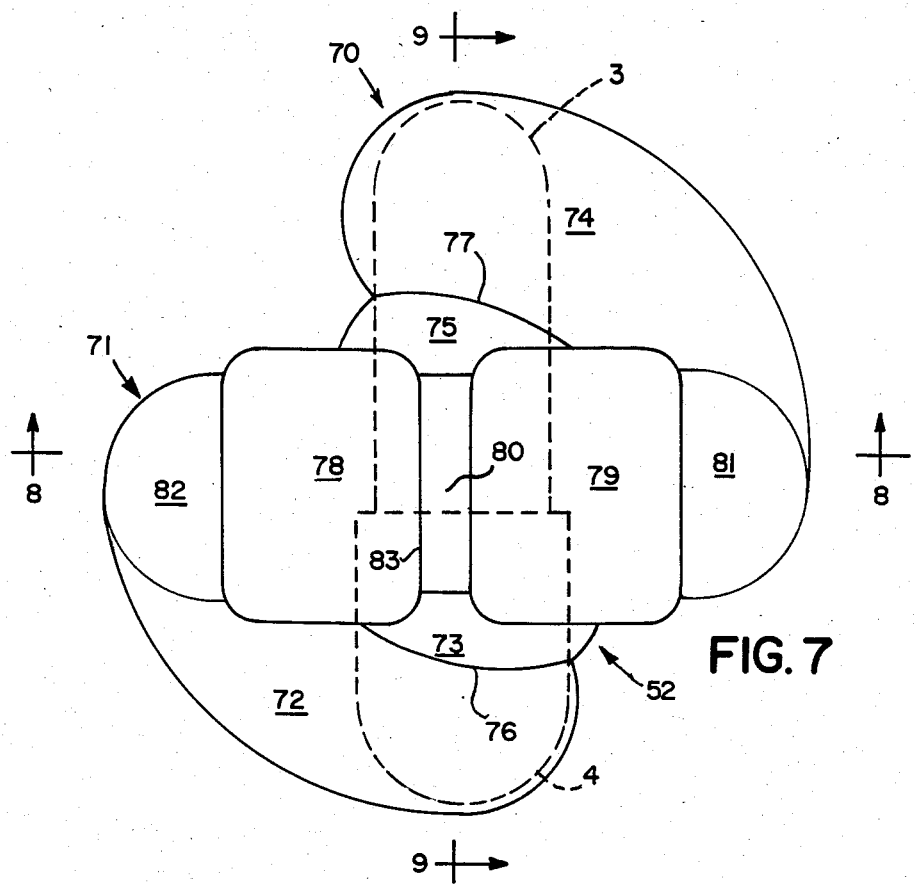
FIG. 7 is a top plan view of one of the pockets of the carrier bar illustrated in FIG. 6.
Figure 8:
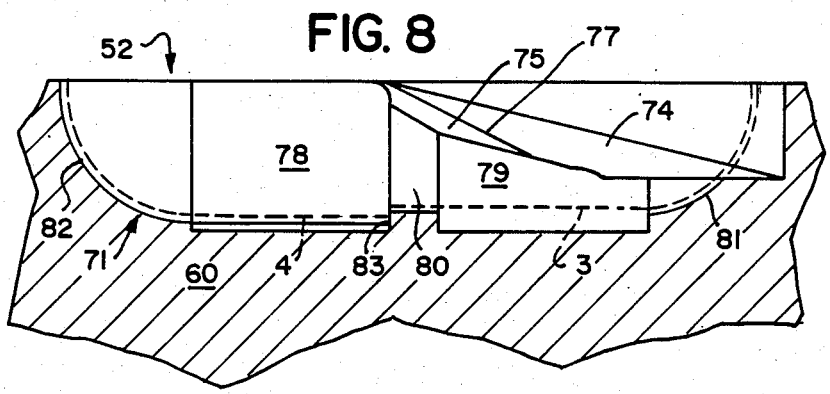
FIG. 8 is a sectional view of the pocket shown in FIG. 7, taken along line 8—8.

It will be seen that each pair of sloping surfaces 72, 73 and 74, 75 generally comprises a major sloping surface 72, 74 and a minor sloping surface 73, 75 which are separated by ridges 76, 77. Both the major sloping surfaces 72, 74 and the minor sloping surfaces 73, 75 preferably slope downwardly and away from the ridges 76, 77 so that a capsule 2 received within the recess 70 (shown in phantom in FIG. 7) is capable of riding along the ridges 76, 77 in its transition from the recess 70 to the recess 71, rather than along the various sloping surfaces provided. This has been found to improve reliability in transfering a capsule 2 from the recess 70 to the recess 71 (shown in phantom in FIG. 8), with further assistance being provided by the vibration means 63.

As is conventional, the recess 71 incorporates structure which is advantageous in properly seating a capsule 2 within the recess 71 for subsequent spin printing operations. To this end, recess 71 generally comprises a pair of cavities 78, 79 separated by an arcuate bearing surface 80. Opposing ends of the cavities 78, 79 are further provided with generally spherical bearing surfaces 81, 82. Bearing surfaces 80, 81 are configured to receive the body portion 3 of a capsule 2 therein such that the center of the capsule 2 is supported by the bearing surface 80 and the end of the body portion 3 of the capsule 2 generally abuts and is supported within the bearing surface 81. The bearing surface 82 is somewhat enlarged in relation to the bearing surface 81 so that the cap portion 4 of a capsule 2 generally abuts and is supported within the bearing surface 82, and is received between the bearing surface 82 and the edge 83 of the bearing surface 80. Thus, upon seating, the capsule 2 is laterally positioned and slidingly retained within the recess 71 in a manner which is appropriate for subsequent spin printing operations to proceed. It will of course be understood that the foregoing structural features will be modified in accordance with the size and type of capsule or other article being processed to achieve a seating within recess 71 which is appropriate for spin printing operations to proceed.

It will therefore be seen that the foregoing apparatus serves well to achieve the various objects previously set forth, by receiving capsules in random orientation for subsequent rectification, and by transferring such capsules to a carrier system which is capable of rotating the capsules from the orientation in which they are received from the rectification system to an orientation which is appropriate for spin printing operations, without the need for moving parts such as were prevalent in prior art devices. It will also be understood that the foregoing apparatus is capable of variation without departing from the spirit and scope of the present invention.

For example, the foregoing apparatus is clearly capable of modification to handle articles of different sizes and shapes by suitably modifying the pockets 11, 31, 52 previously described. Other variations in the mechanical components of the system are also possible, including changes in the configuration of the drums, changes in the configuration of the conveyor system, and changes in the number of rows of capsules which are simultaneously processed in parallel by the apparatus.

Figure 10:
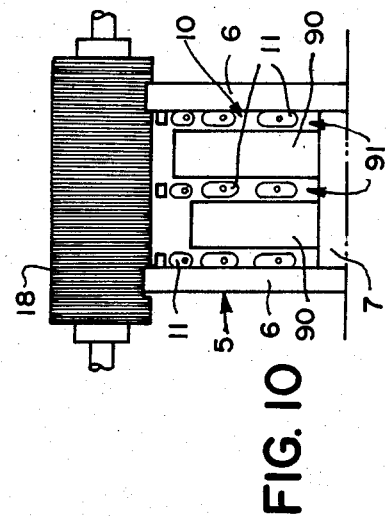
FIG. 10 is an end view of the feed hopper of the apparatus illustrated in FIG. 1.

A further improvement, provided in connection with the hopper assembly 5, is illustrated with reference to FIGS. 1 and 10 of the drawings. Previously, the hopper 5 used in connection with an apparatus such as is addressed in the present application merely comprised an open container, the bottom of which was fitted with a guide overfitting the rectifying drum 10 and incorporating a series of slots for enabling capsules 2 to pass from the hopper 5 to the rectifying drum 10. In the apparatus 1 of the present invention, these fixed guides have been replaced with reciprocating fingers 90 which overfit the rectifying drum 10 so as to develop passages 91 from the hopper 5 to the rows of pockets 11 of the rectifying drum 10. The fingers 90 are caused to reciprocate as the apparatus 1 is operated, since such reciprocation has been found to be advantageous in assuring that the capsules 2 are efficiently delivered to the rectifying drum 10, further reducing the potential for a pocket 11 to pass beneath the hopper 5 without receiving a capsule 2.

To achieve the desired reciprocation, each of the fingers 90 are provided with elongated apertures 92, 93. Apertures 92 engage a pair of guide rods 94 which are fixed in relation to the remainder of the apparatus 1. The apertures 92 are configured and oriented such that the fingers 90 will be caused to progress along a generally arcuate path, following the shape of the rectifying drum 10, as the fingers are reciprocated with respect to each other. To accomplish reciprocation, the aperture 93 engages an eccentric 95 which is rotatable about a shaft 96. Thus, as eccentric 95 rotates within the aperture 93, the fingers 90 are caused to reciprocate.

It has been found that different types of reciprocation are advantageous in connection with different types of articles being processed. For example, at some times it is desirable for the fingers 90 to reciprocate in phase. At other times, it is desirable for the fingers 90 to reciprocate 180° out of phase. In still other applications, phase variations between these two positionings may be desirable. For this reason, the eccentrics 95 are preferably variable in radial orientation with respect to the shaft 96, such as by means of a slip fitting or the like, to enable the phasing of the fingers 90 to be varied.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for presenting a plurality of articles to a printing apparatus, comprising:
   (a) a feed hopper for receiving said articles in random orientation;
   (b) rectification means for receiving said articles from said feed hopper and for delivering said articles from said rectification means in a uniform orientation; and
   (c) carrier means having a pocket formed in a surface thereof, for receiving uniformly oriented articles from said rectification means and for realigning said articles for presentation to said printing apparatus, wherein said pocket comprises:
      (1) a pair of elongated recesses formed at an angle to one another and each lying in a plane generally parallel with the surface of said carrier means, each of said recesses being configured to receive one of said articles, wherein a first of said recesses is oriented so as to receive an article from said rectification means and a second of said recesses is oriented so as to present said article to said printing apparatus; and
      (2) sloping surfaces connecting said pair of recesses so that an article received in said first recess is caused to be transported upon said sloping surfaces to said second recess as said carrier means progresses to said printing apparatus.

2. The apparatus of claim 1 wherein said recesses are separated by an angle of approximately 90°.

3. The apparatus of claim 2 wherein said articles are delivered from said rectification means in a generally longitudinal orientation, and are realigned from said generally longitudinal orientation to a generally transverse orientation for presentation to said printing apparatus.

4. The apparatus of claim 3 wherein said articles are realigned without changing the alignment of either of said pockets.

5. The apparatus of claim 1 wherein said first recess is a shallow recess configured to initially receive one of said articles, and said second recess is a deeper recess configured to subsequently cradle one of said articles for presentation to said printing apparatus.

6. The apparatus of claim 5 wherein a pair of sloping surfaces extend between said recesses.

7. The apparatus of claim 1 wherein said printing apparatus is a spin printing apparatus and said second recess is configured to receive said article for presentation to said spin printing apparatus.

8. The apparatus of claim 7 wherein said second recess comprises a pair of cavities separated by a centrally disposed bearing surface, and wherein opposite ends of said cavities are provided with additional bearing surfaces configured so that said article is received within said cavities and between said additional bearing surfaces, and is supported at its center by said centrally disposed bearing surface.

9. The apparatus of claim 8 wherein said centrally disposed bearing surface is essentially arcuate and concave, and said additional bearing surfaces are essentially spherical and concave.

10. The apparatus of claim 9 wherein said bearing surfaces are configured to receive said article within said second recess so that lateral movement of said article is substantially precluded, and so that rotation of said article about its longitudinal axis is permitted.

11. The apparatus of claim 9 wherein said article is a capsule having a body portion and a cap portion telescopically overfitting said body portion, and wherein said cap portion is shorter and wider than said body portion.

12. The apparatus of claim 11 wherein said centrally disposed bearing surface and one of said additional bearing surfaces are configured to receive the body portion of said capsule and said other additional bearing surface is enlarged and configured to receive the cap portion of said capsule so that said cap portion of said capsule rests between said other additional bearing surface and the nearest lateral edge of said centrally disposed bearing surface.

13. The apparatus of claim 1 wherein said apparatus is adapted for the parallel processing of articles and wherein said carrier means comprises a plurality of said pockets positioned at spaced intervals along said carrier means.

14. The apparatus of claim 13 wherein said apparatus comprises a plurality of juxtaposed carrier means mounted to conveyor means for transporting said carrier means from said rectification means to said printing apparatus.

15. The apparatus of claim 14 wherein edge portions of said carrier means are notched between adjacent pockets to develop relieved areas for receiving misfed articles between adjacent carrier means.

16. The apparatus of claim 1 wherein said carrier means is a carrier bar having a first recess for receiving said pocket and a second recess for receiving a bearing block for engaging vibration means associated with selected portions of said apparatus.

17. The apparatus of claim 16 wherein said vibration means is located between said rectification means and said printing apparatus, for contact by the bearing block of said carrier means between said rectification means and said printing apparatus only.

18. The apparatus of claim 1 wherein said rectification means comprises at least one drum adapted for rotation and having a plurality of article rectifying pockets disposed in and along its periphery, and wherein said feed hopper overlies a portion of said drum to deliver articles to said pockets.

19. The apparatus of claim 18 wherein at least one finger is positioned to overly said drum at the interface with said feed hopper, and is adapted to longitudinally reciprocate in an arcuate path along the surface of said drum.

20. The apparatus of claim 19 wherein said finger incorporates a pair of elongated slots engaging fixed support pins and aligned so as to develop said arcuate path, and an elongated slot engaging eccentric drive means for moving said finger along said arcuate path.

21. The apparatus of claim 10 wherein a plurality of said fingers are reciprocated in phase.

22. The apparatus of claim 19 wherein phasing of said reciprocation is adjustable.

23. The apparatus of claim 22 having a plurality of reciprocating fingers, wherein respective phasing of said reciprocation is adjustable.

24. The apparatus of claim 18 wherein said drum is provided with vacuum means for assisting in transfer of said articles from said feed hopper to the pockets of said drum.

25. The apparatus of claim 24 wherein said vacuum means comprises:
(a) a plurality of channels radially disposed in said drum and communicating with base portions of said rectifying pockets;
(b) a plurality of manifolds tranversely disposed in said drum and extending to a side face of said drum, and communicating with said channels; and
(c) a vacuum manifold positioned adjacent to said side face of said drum in general alignment with said feed hopper, and adapted to overfit selected ones of said plurality of manifolds to develop a vacuum only at the bases of those pockets which are facing said feed hopper.

26. The apparatus of claim 25 wherein said drum incorporates plural rows of pockets and wherein one of said plurality of manifolds communicates with a plurality of pockets extending across the face of said drum.

27. The apparatus of claim 18 wherein said rectification means further comprises a second drum adapted for rotation and having a plurality of article receiving pockets disposed in and along its periphery so as to receive articles from the pockets of said first drum for transfer to said carrier means.

28. The apparatus of claim 27 which further comprises vacuum means for assisting in the transfer of articles from the first drum to the second drum.

29. The apparatus of claim 28 wherein said vacuum means comprises:
(a) at least one radially disposed, essentially circumferential slot formed in said second drum and extending to the bases of the pockets of said second drum;
(b) a plurality of manifolds transversely disposed in said second drum and extending to a side face of said second drum, and communicating with said slot; and
(c) a vacuum manifold positioned adjacent to said side face of said second drum in general alignment with the region in which the second drum communicates with said first drum, and adapted to overfit selected ones of said plurality of manifolds to develop a vacuum only at the bases of those pockets which are facing said first drum.

30. The apparatus of claim 29 wherein said second drum incorporates plural rows of pockets, and a single slot in communication with each of said pockets for each of said rows of pockets, and wherein each one of said plurality of manifolds communicates with each of said plurality of slots.

31. The apparatus of claim 29 wherein said articles are capsules having a body portion and a cap portion telescopically overfitting said body portion, and wherein the bases of said pockets are sized to slidingly receive the body portions of said capsules and to frictionally engage the cap portions of said capsules.

32. The apparatus of claim 31 wherein capsules which are slidingly retained in said pockets are delivered from said second drum to said carrier means, and wherein capsules which are frictionally retained in said pockets are conveyed by said second drum past said carrier means to a discharge position.

33. The apparatus of claim 32 wherein a knock-out bar is located within the slot of said second drum to discharge from the pockets any capsules which are frictionally retained therein.

34. A carrier for receiving a articles from an article rectifying apparatus for subsequent delivery to a printing apparatus, and comprising at least one pocket formed in a surface of said carrier and having a pair of elongated recesses configured to receive one of said articles, each of said recesses lying in a plane generally parallel with the surface of said carrier, a first recess which is oriented to receive an article from said rectifying apparatus, and a second recess which is oriented at an angle to said first recess and to present said article to said printing apparatus, and sloping surfaces extending from said first recess to said second recess so as to cause an article received in said first recess to be transported upon said sloping surfaces to said second recess while simultaneously rotating said article about a vertical axis from the orientation in which it is received from said rectifying apparatus to an orientation for delivery to said printing apparatus.

35. The carrier of claim 34 wherein said recesses are separated by an angle of approximately 90°.

36. The carrier of claim 34 wherein said first recess is a shallow recess configured to initially receive one of said articles, and said second recess is a deeper recess configured to subsequently cradle one of said articles for presentation to said printing apparatus.

37. The carrier of claim 36 wherein a pair of sloping surfaces extend between said recesses.

38. The carrier of claim 34 wherein said printing apparatus is a spin printing apparatus and said second recess is configured to receive said article for presentation to said spin printing apparatus.

39. The carrier of claim 34 wherein said articles are rotated for reorientation without rotating said pocket.

40. In an apparatus for rectifying generally cylindrical articles using a rotating drum having a plurality of pockets disposed in and along its periphery, means for providing vacuum to selected pockets of said drum comprising:
(a) a vacuum manifold overlying portions of one side of said drum which are in alignment with said selected pockets;
(b) a plurality of manifolds extending transversely through said drum to said side, wherein selected ones of said manifolds are in communication with said vacuum manifold; and
(c) a generally radially disposed, essentially circumferential slot formed in said drum and communicating between said plurality of manifolds and said plurality of pockets, for providing vacuum developed at said vacuum manifold to said selected pockets.

41. In an apparatus for rectifying articles and including a rectifying drum and a feed hopper overlying portions of said rectifying drum, an improved feed means comprising at least one finger positioned in said feed hopper to overly said drum at the interface between said drum and said feed hopper, and adapted to longitudinally reciprocate in an arcuate path along the surface of said drum, wherein said finger incorporates a pair of elongated slots engaging fixed support pins and aligned so as to develop said arcuate path, and an elongated slot engaging eccentric drive means for moving said finger along said arcuate path.

42. An apparatus for preventing a plurality of articles to a printing apparatus, comprising:
 (a) a feed hopper for receiving said articles in random orientation;
 (b) rectification means for receiving said articles from said feed hopper and for delivering said articles from said rectification means in a uniform orientation; and
 (c) carrier means having a pocket for receiving uniformly oriented articles from said rectification means and for realigning said articles for presentation to said printing apparatus, wherein said pocket comprises:
  (1) a pair of elongated recesses formed at an angle to one another, each of which is configured to receive one of said articles, wherein a first of said recesses is a shallow recess configured so as to initially receive an article from said rectification means and a second of said recesses is a deeper recess configured so as to subsequently cradle and present said article to said printing apparatus; and
  (2) a pair of sloping surfaces positioned opposite to one another and extending between said pair of recesses, and incorporating cooperating slopes which progress downwardly from said first recess to said second recess so that an article received in said first recess is capable of being transported along said sloping surfaces to said second recess as said carrier means progresses to said printing apparatus.

43. The apparatus of claim 42 wherein each of said sloping surfaces comprises a major and a minor portion separated by a ridge extending from said first recess to said second recess.

44. The appartus of claim 43 wherein said major and minor portions slope downwardly and away from said ridge so that an article is received on said ridge in passing from said first recess to said second recess.

45. The apparatus of claim 42 wherein said article is a capsule having a body portion and a cap portion which telescopically overfits said body portion, and wherein said cap portion is shorter and wider than said body portion.

46. The apparatus of claim 45 wherein a first of said sloping surfaces is shorter and deeper than the second of said sloping surfaces, and wherein said first sloping surface is adapted to receive said cap portion and said second sloping surface is adapted to receive said body portion.

47. The apparatus of claim 46 wherein said capsule is longitudinally received from said rectification means in said first recess, and is axially rotated about its vertical axis from said longitudinal orientation to a transverse orientation for presentation to said printing apparatus as said capsule traverses said sloping surfaces.

48. A carrier for receiving articles from an article rectifying apparatus for subsequent delivery to a printing apparatus, and comprising at least on pocket having a pair of elongated recesses, a first recess which is shallow and configured to initially receive an article from said rectifying apparatus, and a second recess which is deeper than said first recess and oriented at an angle to said first recess so as to subsequently cradle and present said article to said printing apparatus, and a pair of sloping surfaces positioned opposite to one another and incorporating slopes which progress downwardly from said first recess to said second recess so as to guide an article received in said first recess along said sloping surfaces to said second recess while simultaneously rotating said article about a vertical axis from the orientation in which it is received from said rectifying apparatus to the orientation for delivery to said printing apparatus.

49. The carrier of claim 48 wherein each of said sloping surfaces comprises a major and a minor portion separated by a ridge extending from said first recess to said second recess.

50. The carrier of claim 49 wherein said major and minor portions slope downwardly and away from said ridge so that an article is received on said ridge in passing from said first recess to said second recess.

* * * * *